(12) United States Patent
Brown et al.

(10) Patent No.: US 8,897,158 B2
(45) Date of Patent: Nov. 25, 2014

(54) METHOD AND SYSTEM FOR ON-DEMAND ADAPTATION OF PACKET TIME-TO-LIVE IN TIME-SLOTTED BARRAGE RELAY NETWORKS

(75) Inventors: Thomas A Brown, Cardiff by the Sea, CA (US); Thomas R Halford, Manhattan Beach, CA (US); Mark L Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 93 days.

(21) Appl. No.: 13/480,384

(22) Filed: May 24, 2012

(65) Prior Publication Data

US 2013/0315078 A1 Nov. 28, 2013

(51) Int. Cl.
| | |
|---|---|
| *G01R 31/08* | (2006.01) |
| *G06F 11/00* | (2006.01) |
| *G08C 15/00* | (2006.01) |
| *H04L 12/26* | (2006.01) |
| *H04W 4/00* | (2009.01) |
| *H04J 1/16* | (2006.01) |
| *H04J 3/14* | (2006.01) |
| *H04L 1/00* | (2006.01) |

(52) U.S. Cl.
USPC .................. 370/252; 370/238; 455/432.2

(58) Field of Classification Search
USPC ................... 370/238, 252; 455/432.2
See application file for complete search history.

(56) References Cited

U.S. PATENT DOCUMENTS

| | | | |
|---|---|---|---|
| 2005/0113086 A1* | 5/2005 | Wilson | 455/432.2 |
| 2006/0126514 A1* | 6/2006 | Lee et al. | 370/238 |
| 2009/0313528 A1 | 12/2009 | Chugg et al. | |
| 2010/0188989 A1* | 7/2010 | Wing et al. | 370/252 |

OTHER PUBLICATIONS

Andrews, J. et al., "Rethinking information theory for mobile ad hoc networks," *IEEE Transactions on Information Theory*, vol. 46, No. 12, pp. 94-101, Dec. 2008.
Blair, A. et al., "Barrage relay networks for cooperative transport in tactical MANETs," in *Proc. IEEE Military Communications Conference*, San Diego, CA, Nov. 2008.
Calinescu, G., "Computing 2-hop neighborhoods in ad hoc wireless networks," in *Proc. 2nd Int'l Conf. Ad Hoc, Mobile, and Wireless Networks (ADHOC-NOW 2003)*, Montreal, Canada, Oct. 2003.

(Continued)

*Primary Examiner* — Helal A Algahaim
*Assistant Examiner* — Mahmoud Ismail
(74) *Attorney, Agent, or Firm* — Kilpatrick Townsend & Stockton LLP

(57) ABSTRACT

Methods and systems for on-demand adaptation of packet time-to-live in time-slotted barrage relay networks are disclosed. For example, one disclosed method includes: transmitting a first packet from a first node in a wireless ad hoc network to a second node in the wireless ad hoc network; determining a first path distance, in terms of number of hops, from the first node to the second node, based on the first packet transmission; transmitting a second packet from the second node to the first node, wherein the second packet includes content representing the first path distance; and determining a time-to-live value for subsequent transfers from the first node to the second node, by taking into account the first path distance, wherein the time-to-live value limits the number of hops each packet is allowed to take in subsequent transfers from the first node to the second node.

11 Claims, 3 Drawing Sheets

(56) References Cited

OTHER PUBLICATIONS

Chlamtac, I. et al., "Mobile ad hoc networking: imperatives and challenges," *Ad Hoc Networks*, vol. 1, No. 1, pp. 13-64, Jul. 2003.

Crow, B. P. et al., "IEEE 802.11 wireless local area networks," *IEEE Communications Magazine*, vol. 35, No. 9, pp. 116-126, Sep. 1997.

Halford, T. R. and Chugg, K. M., "Barrage relay networks," in *IEEE Information Theory and Applications Theory Workshop (ITA)*, La Jolla, CA, Feb. 2010.

Halford, T. R. et al., "Barrage relay networks: System and protocol design," in *Proc. IEEE Personal, Indoor, and Mobile Radio Conference (PIMRC)*, Istanbul, Turkey, Sep. 2010.

Lee, D. K. and Chugg K. M., "Pragmatic cooperative diversity communications," in *Proc. IEEE Military Communications Conference*, Washington, DC, Oct. 2006.

Perkins, C. E. and Bhagwat P., "Highly dynamic destination-sequence distance-vector routing (DSDV) for mobile computers," in *Proc. ACM Special Interest Group on Data Communications*, pp. 234-234, London, United Kingdom, Sep. 1994.

Perkins, C. E. and Royer E. M., "Ad hoc on-demand distance vector routing," in *Proc. IEEE Workshop on Mobile Computing Systems and Applications*, pp. 90-100, New Orleans, LA, Feb. 1999.

Ramanathan R., "Challenges: A radically new architecture for next generation mobile ad hoc networks," in *Proc. ACM/IEEE International Conf. on Mobile Computing and Networking*, pp. 132-139, Cologne, Germany, Aug. 2005.

\* cited by examiner

METHOD AND SYSTEM FOR ON-DEMAND ADAPTATION OF PACKET TIME-TO-LIVE IN TIME-SLOTTED BARRAGE RELAY NETWORKS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates to systems and methods for establishing the extent and rate of transmission between a data source and data destination, possibly via a plurality of intermediate relay nodes, in a wireless communications network

BACKGROUND

The use of networks and mobile networks has grown exponentially in recent years. Networks transmit blocks of data between locations on the networks called nodes. As the complexity, and number of nodes on a network goes up, so does the risk of collisions on the network. Adapting the time-to-live of nodes in a network can both decrease the probability of collisions and increase the efficiency with which network resources are used. Accordingly, there is a need for on-demand adaptation of packet time-to-live in time-slotted barrage relay networks.

SUMMARY

Embodiments of the present invention include methods and systems for on-demand adaptation of packet time-to-live in time-slotted barrage relay networks. For example, in one embodiment, a method for adaptation of packet time-to-live comprises: transmitting a first packet from a first node in the wireless ad hoc network to a second node in the wireless ad hoc network; determining a first path distance, in terms of number of hops, from the first node to the second node, based on the first packet transmission; transmitting a second packet from the second node to the first node, wherein the second packet includes content representing the first path distance; and determining a time-to-live value for subsequent transfers from the first node to the second node, by taking into account the first path distance, wherein the time-to-live value limits the number of hops each packet is allowed to take in subsequent transfers from the first node to the second node.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

DETAILED DESCRIPTION

Figure 1:
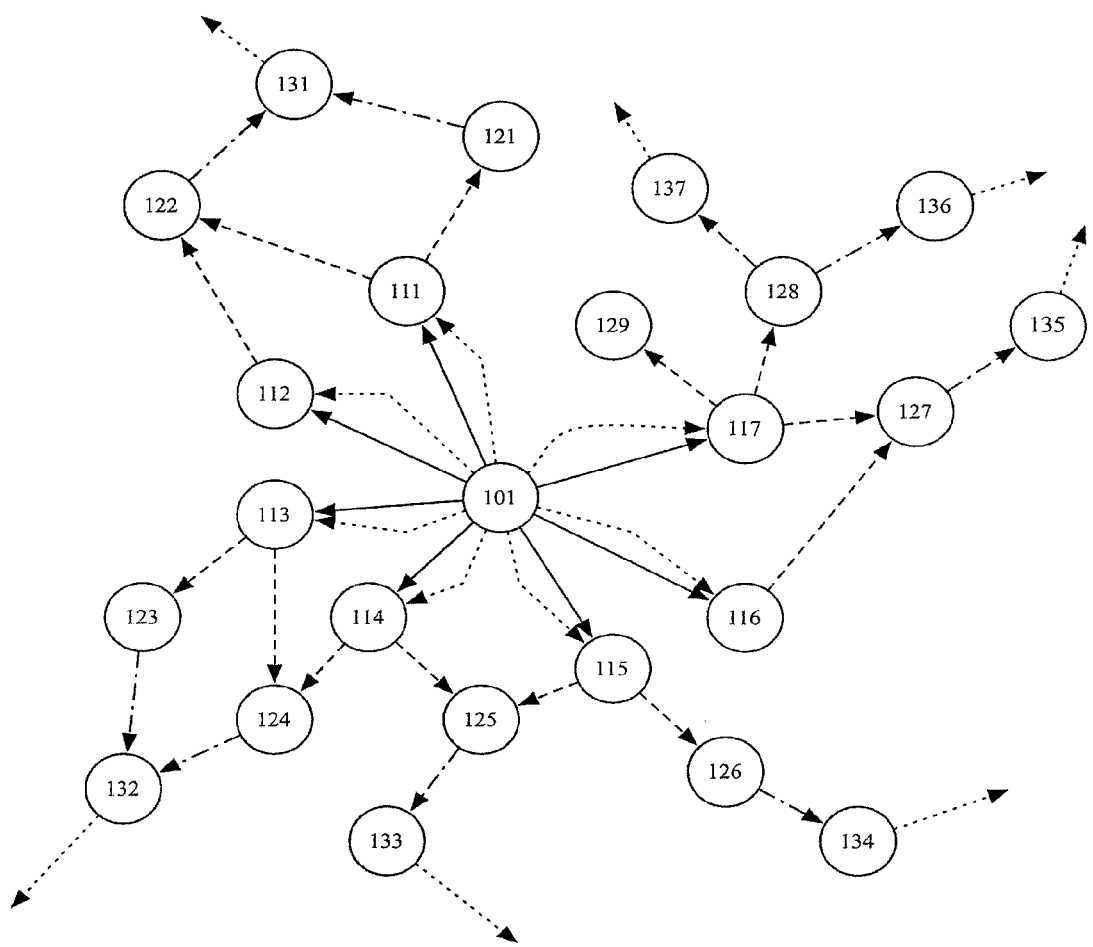
FIG. 1 shows an illustrative broadcast flooding protocol for barrage relay networks, according to one embodiment of the present invention.
Figure 1:
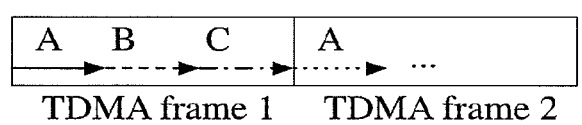

Mobile ad hoc networks (MANETs) are the focus of considerable research and development. MANETs can be distinguished from other classes of wireless networks—such as satellite, cellular, and Wireless Local Area Networks (WLANs)—by a lack of dependence on fixed infrastructure. If a source node wishes to send data to a distinct destination node (or plurality of nodes), but cannot do so via a direct link (due to, for example, a large spatial separation between the source and destination nodes), then a multi-hop communication link can be established through a plurality of intervening nodes that provide a relay function. A distinguishing feature of a MANET is that at any given time, any given node can act as a source, destination, or relay for data transmission.

MANET design has traditionally followed the layered approach that was pioneered for wired networks (e.g., the Internet), wherein the network architecture is divided into a stack of protocols, each of which interacts only with the layers directly above and directly below it. See, e.g. I. Chlamtac, et al., "Mobile ad hoc networking: imperatives and challenges," Ad Hoc Networks, vol. 1, no. 1, pp. 13-64, July 2003. One common networking stack is the Open System Interconnection (OSI) Reference Model (OSI Model). In the OSI Model, the bottom layer (Layer 1) is the Physical Layer, which consists of the basic hardware transmission and reception technologies of the network. The Data Link Layer (Layer 2) is above the Physical Layer. One important function of the Data Link Layer is to define the Medium Access Control (MAC) protocol for the network. MAC protocols coordinate access to independent medium allocations (i.e., uses of the Physical Layer). Two medium allocations are said to be independent if there is sufficient isolation between the first allocation and second allocation such that activity in the second allocation does not significantly affect the reception of signals in the first allocation (and vice versa). Typical methods of providing independent allocations include, but are not limited to, non-overlapping time slots, different frequency channels, different antenna radio patterns, low cross-correlation spreading sequences (in spread spectrum systems), as well as any combination of these techniques.

The MAC protocols that have heretofore been the focus of academic and industrial MANET research allocate access to point-to-point links between the nodes in an effort to mimic direct wired connections. In order to achieve this point-to-point link abstraction, collision avoidance protocols are employed whereby only a single node within any two-hop radius is permitted to transmit on a given independent medium allocation. Unfortunately, forcing the wired paradigm onto the inherently broadcast wireless medium leads to problems that have been widely documented in the literature. For example, the increased latency associated with re-contending for the medium at each hop and for each packet of a multi-hop, multi-packet data transfer is simply unacceptable for many important MANET applications (e.g., voice and video transmission in military and first responder networks). The shortcomings of traditional MANET design have led to calls for new architectures and paradigm shifts in network protocol stack design. See, e.g., R. Ramanathan, "Challenges: A radically new architecture for next generation mobile ad hoc networks," in *Proc. ACM/IEEE International Conf. on Mobile Computing and Networking*, pp. 132-139, Cologne, Germany, August 2005.

A first step toward alleviating the aforementioned problems and revisiting the MANET networking problem is discussed in U.S. Patent Publication No. 2008-0107044, filed Aug. 2, 2007, entitled "Methods and Apparatus for Network Communication via Barrage Relay Onto an Independent Medium Allocation," which introduced the concept of barrage relay as a way for multiple network nodes to access the various wireless links in a manner that is delay-efficient, enhances the signal-to-noise ratio (SNR)—and therefore the reception probability—of each packet reception per node, and circumvents the problem of packet collisions inherent in classical MAC protocols that are based on the aforementioned point-to-point link abstraction. Barrage relay networks (BRNs) allow for the definition of an efficient protocol for broadcasting information throughout a network via a flooding mechanism that exploits cooperative communications at Layer 1. For example, this cooperative scheme may be autonomous in that nodes need not coordinate explicitly. Rather, cooperative behavior emerges implicitly via intelligent signal design techniques.

FIG. 1 illustrates an ad hoc network where independent medium allocations are obtained via a time-division multiple access (TDMA) scheme. While barrage relay networks can be defined according to a plethora of different medium allocation schemes (e.g., time slotting, different frequency channels, different antenna radiation patterns, low cross-correlation spreading sequences), the present invention is especially applicable to time-slotted barrage relay networks. In particular, time is divided into frames, which are further divided into M slots per frame (FIG. 1 employs 3 slots per frame labeled "A", "B", and "C"). The value of M is denoted the "spatial pipelining factor" in the follow paragraphs. The data that is transmitted in a given time slot is denoted a "packet." Two packets that are transmitted by two different nodes are said to be identical if all data—including all protocol header information—contained in the respective packets is identical.

In one embodiment, for example, the central node 101 transmits a packet on slot A of the first TDMA frame. All nodes that successfully receive this packet are, by definition, one hop away from the source. These nodes are labeled 111, 112, . . . , 117 in FIG. 1. These nodes transmit the same packet on slot B, thus relaying to nodes that are 2 hops away from the source (nodes 121, 122, . . . , 129), which in turn transmit the same packet on slot C. Nodes that are 3 hops away from the source (nodes 131, 132, . . . , 137) relay the packet on slot A of the second TDMA frame. In this way, packets transmit outward from the source via a decode-and-forward approach.

To prevent the relay transmissions from propagating back towards the source, each node relays a given packet only once. For example, one-hop nodes receive the first broadcast packet on slot A (from the source) and again on slot C (from 2-hop nodes) but only relay on slot B.

In the embodiment shown in FIG. 1, a number of two-hop nodes receive the same slot from different one-hop nodes. These packets do not collide due to the physical layer ("PHY") processing employed by BRNs. Specifically, BRNs employ a PHY layer that allows identical packets to be combined at the receiver in a manner analogous to multipath mitigation in traditional radio receivers. That is to say, the multiple, time-shifted copies of the received signal that arise in BRNs can be interpreted at the receiver as resulting not from different transmitting nodes, but from reflections off, for example, buildings when a single source transmits In order for two packets to be identical, both the payload data and all protocol header data must be identical. Therefore, protocol headers in a barrage relay network can be modified only in a manner that is common across all nodes at a given hop distance from the source. This is in stark contrast to traditional layered network architectures that employ a point-to-point link abstraction at Layer 2, wherein protocol headers can be modified in a node-specific—as opposed to a hop-specific—manner.

In some embodiments, the spatial reuse of time slots enables packets to be pipelined into the source for transmission every three slots. Specifically, in the embodiment shown in FIG. 1, the one-hop nodes will not receive the packet broadcast by the three-hop nodes during slot A of the second TDMA frame. Thus, the source can safely transmit a second packet during that slot. In this manner, a throughput of W/3 can be achieved for broadcast in a single-source BRN (W is the capacity of a single point-to-point link). We denote this efficient injection of messages for transmission "spatial pipelining" in order to highlight its reuse of time slots between spatially separated nodes.

More generally, spatial pipelining can be achieved by having a source node inject a new packet for barrage relay broadcast every M slots resulting in a throughput of W/M. In some embodiments, for example, in an arbitrary networks (i.e., where the size of the network is unknown to the source a priori), M must be at least 3 to avoid collisions. Larger spatial pipelining factors (e.g., 4) may be chosen in order to enhance robustness in highly mobile network topologies.

Thus far, BRNs have been described in the context of a network-wide broadcast—i.e., all nodes relay and receive a given packet. In some embodiments, for unicast transmission (or multicast transmission where all of the intended destinations are within some distance in hops of the source), a controlled barrage broadcast can be employed. Specifically, in order to contain the extent of a given barrage relay transmission, two fields can be incorporated into the header (preamble) of each data packet: a time-to-live (TTL) field and a hop count (HC) field. The TTL field is unchanged by relaying nodes while the HC field is set to 1 by the source of a packet and incremented upon relay. Returning to the example of FIG. 1, in one embodiment, a TTL of 8 may be incorporated into the packets transmitted by node 101. The one-hop neighbors of this node would receive such packets and relay a modified packet with the HC field set to 2. Similarly, two-hop neighbors set the HC to 3 and so on. Relaying stops whenever a packet with equal TTL and HC fields is received. In some embodiments, since the change in the HC field depends only on the distance from the source, each node at a given distance from the source will still receive multiple copies of identical packets. Therefore, the use of a HC field does not break the foundational assumptions of barrage relay.

In some embodiments, choosing constant TTL and spatial pipelining factor ensures that there are no collisions of distinct data packets in the worst case (i.e., transmissions that extend beyond M hops). Available throughput is wasted in the case of shorter transmissions. For example, in one embodiment, the source node may know a priori that the destination node is one hop away. In such an embodiment, packets could be injected for transmission at the source every single time slot provided the TTL of those packets is 1 (i.e., provided the packets are not relayed by the one-hop neighbors of the source). Similarly, efficient transmission to a two-hop neighbor can be achieved by setting the TTL of packets to 2 and setting M=2 also.

In general, the extent of a given packet transmission in a barrage relay network is controlled by the TTL field. For a specific value of that field, the minimum spatial pipelining factor $M_{min}$ required to avoid collisions is:

$$M_{min} = \min(TTL, 3) \quad (1)$$

In some embodiments, when the TTL of the packets comprising a given multi-packet transmission is greater than or equal to 3, then the spatial pipelining factor must be at least 3 to avoid collisions. In other embodiments, when the TTL is 1 or 2, collisions are avoided when M is set to 1 or 2, respectively. In this way, direct control of the extent of transmission via TTL can result in indirect control of the rate of transmission provided that the spatial pipelining factor is set according to equation (1).

In one embodiment, a source node S1 may transmit with a TTL of T1. In such an embodiment, a second source node S2 can simultaneously transmit with a TTL of T2 without interfering with the S1 transmissions provided that the distance in hops between S1 and S2 is greater than T1+T2. In this manner, altering the TTL of the packets comprising a transmission not only affects the efficiency of that specific transmission, but can also affect the efficiency of the network by enabling multiple source nodes to transmit data simultaneously.

The present invention utilizes link state information (LSI)—i.e., whether links exist, as well as some measure of their quality—in order to determine the TTL for a given transmission. For example, in some embodiments, if a given destination node is known to be a neighbor of a given source node, then that source/destination pair is a candidate for a TTL=1 transmission. In such an embodiment, the LSI may be obtained proactively or reactively. In some embodiments, proactive LSI obtention typically entails the maintenance of 1- and 2-hop neighborhood tables at each node. In such embodiments, these tables tabulate which nodes are one and two hops from that node as well as the quality of the links. In other embodiments, reactive LSI obtention is performed on-demand in response to a desired transmission from a given source to a given destination.

In some embodiments, the packets transmitted in the time-slotted barrage relay network comprise a TTL and a HC field. Further, in some embodiments the data transfer is unicast or multicast from a source node ("S") to a set of destination nodes. In the case of unicast transmission, the single destination node is denoted "D". In the case of multicast transmission, the plurality of destination nodes are denoted "$D_1$", "$D_2$", . . . , "$D_T$" for some T that is greater than or equal 1.

Reactive Protocol for Unicast Description

The reactive protocol for setting the TTL of a subsequent unicast transmission utilizes control messages in order to discover the LSI on those links that comprise the shortest paths between S and D. In some embodiments, the reactive protocol is used to determine the distance (in hops) between the source and destination, which is then used to determine the appropriate TTL value—and hence the spatial pipelining factor—for subsequent (possible multi-) packet data transfers from S to D.

The following notation is employed in the following paragraphs. The distance (in hops) of the shortest path from S to D is denoted $d(S \to D)$. Similarly, the reverse distance from D to S is denoted $d(D \to S)$. Note in some embodiments $d(S \to D) = d(D \to S)$ and in other embodiments $d(S \to D) \neq d(D \to S)$. The cooperative communication mechanism that is employed in BRNs (i.e., a plurality of nodes simultaneously relaying the identical packets on the same slot) can lead to cases where $d(S \to D) \neq d(D \to S)$ in certain network topologies. Furthermore, in some embodiments, there may be a default TTL value denoted $TTL_D$ that is employed in the system (e.g., 10 for a network that supports transmissions of at most 10 hops).

In some embodiments, the present invention uses a two-phase protocol to discover LSI. The first phase of this discovery protocol employs a packet transmission from S to D to discover $d(S \to D)$; the second phase employs a subsequent packet transmission from D to S to discover $d(D \to S)$. In another embodiment of the invention, protocols with additional phases that further refine the estimates of $d(S \to D)$ and $d(D \to S)$ ascertained during the first two phases may be employed.

According to one embodiment of the present invention, the source node "S" initiates the first discovery protocol phase by broadcasting a packet denoted "Packet S→D". The TTL field of this message is set to the system default (i.e., the value that ensures all network nodes receive the packet). The data field of Packet S→D lists unique identifiers (UIDs) of S and D so that D can ascertain that it is indeed the intended destination for this packet (and that S was indeed the source).

In some embodiments, upon receipt of Packet S→D, the destination node D can determine $d(S \to D)$ based on the hop-count field of the received packet. Specifically, if D is X hops from S (for some X>0), then the HC field in the received packet will be precisely X. The destination node D subsequently initiates the second phase of the discovery protocol by broadcasting a packet that contains (i) $d(S \to D)$ and (ii) the UIDs for S and D in its data field (again, this packet uses the system default value $TTL_D$ for the TTL field). This packet is denoted "Packet D→S."

In some embodiments, upon receipt of Packet D→S, S will be able to determine both $d(S \to D)$ and $d(D \to S)$. For example, in some embodiments, $d(S \to D)$ may be recovered from the data field of Packet D→S. And in some embodiments, $d(D \to S)$ may be determined based on the HC field of Packet D→S.

In one embodiment of the present invention, the source node may set the TTL for subsequent data transfers between S and D (denoted $TTL_{S \to D}$) based only on the $d(S \to D)$ value obtained via the discovery protocol described above. Specifically, the source node may set the value of $TTL_{S \to D}$ as:

$$TTL_{S \to D} = \begin{cases} 1 & \text{if } d(S \to D) = 1 \\ 2 & \text{if } d(S \to D) = 2 \\ TTL_D & \text{if } d(S \to D) > 2 \end{cases} \quad (2)$$

Following Equation (2), the spatial pipelining factor used for subsequent data transfers between S and D (denoted $M_{S \to D}$) can then be set to:

$$M_{S \to D} = \begin{cases} 1 & \text{if } TTL_{S \to D} = 1 \\ 2 & \text{if } TTL_{S \to D} = 2 \\ M_D & \text{if } TTL_{S \to D} = TTL_D \end{cases} \quad (3)$$

where $M_D$ is the system default value of the spatial pipelining factor (in some embodiments $M_D$ is greater than 3).

In another embodiment of the present invention, the source node may set $TTL_{S \to D}$ based on both $d(S \to D)$ and $d(D \to S)$ (as ascertained via the discovery protocol described above). Specifically, $$TTL_{S \to D} = \begin{cases} 1 & \text{if } d(S \to D) = d(D \to S) = 1 \\ 2 & \text{if } \begin{cases} d(S \to D) \leq 2, d(D \to S) = 2 \\ d(D \to S) \leq 2, d(S \to D) = 2 \end{cases} \\ TTL_D & \text{if } \max(d(S \to D), d(D \to S)) > 2 \end{cases} \quad (4)$$

This scheme may be more robust for rapidly varying topologies. For example, in one embodiment, if $d(D \to S)=2$, yet $d(S \to D)$ is equal to one, then the forward link from S to D may be unreliable. Further, in other embodiments, $M_{S \to D}$ may be set according to (3) regardless of the method used to establish $TTL_{S \to D}$.

In some embodiments, S learns the value of $d(S \to D)$ on-demand in response to the desire by S to transmit data to D (i.e., reactively). The reactive embodiment of the present invention therefore does not depend on proactively maintained neighbor tables.

In another embodiment of the present invention, the LSI is used to inform the TTL decision. In some embodiments, this LSI correlates directly with the probability of reception at a given node. For example, one type of LSI that may be received is the SNR associated with a given packet.

In some embodiments of the present invention, the LSI associated with the reception of the protocols employed by the discovery protocol is known. For example, in one embodiment, let L(D) denote the received LSI of Packet S→D at node D. Further, in such an embodiment, let L(D) denote the received LSI of Packet D→S at node S. In addition to the hop distance $d(S \to D)$, in some embodiments, L(D) can also be included in Packet D→S so that following the two-phase discovery protocol, the source node S knows both L(S) and L(D), as well as both $d(S \to D)$ and $d(D \to S)$.

In one embodiment of the present invention, the source node sets $TTL_{S \to D}$ based only on $d(S \to D)$ and L(D). For example, in one embodiment, $$TTL_{S \to D} = \begin{cases} 1 & \text{if } d(S \to D) = 1, L(D) \geq L^* \\ 2 & \text{if } d(S \to D) = 1, L(D) < L^* \\ TTL_D & \text{if } d(S \to D) \geq 2 \end{cases} \quad (5)$$

where L* is a threshold for the LSI that indicates that a link is reliable. Note that this embodiment sets $TTL_{S \to D}=1$ only for reliable 1-hop transfers and $TTL_{S \to D}=2$ for unreliable 1-hop transfers.

In another embodiment of the invention, the source node sets the TTL of subsequent data packets from S to D based on $d(S \to D)$ and both L(D) and L(S). Specifically, $$TTL_{S \to D} = \begin{cases} 1 & \text{if } d(S \to D) = 1, L(D) \geq L^* \\ 2 & \text{if } \begin{cases} d(S \to D) = 1, L(D) < L^* \\ d(S \to D) = 2, L(D) \geq L^*, L(S) \geq L^* \end{cases} \\ TTL_D & \text{otherwise} \end{cases} \quad (6)$$

where $TTL_D$ is the system default value of the TTL field and L* is a threshold for the LSI that indicates that a link is reliable. In such an embodiment, $TTL_{S \to D}=2$ can be used for 2-hop transfers provided that both (i) the link from the source to its intermediate one-hop relay nodes is reliable (encapsulated in L(S)), and (ii) the link from those same relay nodes to the destination is reliable (encapsulated in L(D)).

In other embodiments, a multitude of other rules for establishing $TTL_{S \to D}$ may be defined using some combination of the information available to the source node after a multiphase discovery protocol (provided that information is contained in Packet D→S).

Proactive Protocol for Multicast Description

According to the present invention, there are many MANET functions that assume the existence of 1-hop and 2-hop neighborhood tables. Typically, these tables list which nodes are a distance 1- and 2-hops from a given node, as well as (possibly) LSI for the links connecting a given node to each of its 1- and 2-hop neighbors. In some embodiments, a BRN will maintain such tables. In such embodiments, the protocol described herein can be employed to set the TTL of multicast transmissions based on proactively maintained LSI.

In one embodiment of the invention, the 1- and 2-hop tables list each of the nodes that are at a distance of 1- and 2-hops, respectively, from a given node. The 1- and 2-hop neighbor tables are denoted by 1HT(S) and 2HT(S), respectively, for the source node S. The distance from S to one of the destination nodes $D_t$ (for $t=1, \ldots, T$) of a desired multicast transmission is:

$$d(S \to D_t) = \begin{cases} 1 & \text{if } D_t \in 1HT(S) \\ 2 & \text{if } D_t \in 2HT(S) \\ > 2 & \text{otherwise} \end{cases} \quad (7)$$

In one embodiment of the present invention, the TTL field of a subsequent multicast transmission from S to $D_1, \ldots, D_T$ is set to:
  (a) one if all of $D_1, \ldots, D_T$ are a distance 1 from S (i.e., if $D_t \in 1HT(S)$ for all $t=1, \ldots, T$).
  (b) two if all of $D_1, \ldots, D_T$ are a distance 1 or 2 from S and at least one of $D_1, \ldots, D_T$ is at a distance of 2 from S.
  (c) $TTL_D$ otherwise.

In another embodiment of the present invention, the 1- and 2-hop tables also include LSI about the links from S to each of its 1- and 2-hop neighbors. In such an embodiment, this LSI may correlate directly with the probability of reception at a given node. In the case of the 1-hop neighbor table, the stored LSI from S to a given 1-hop neighbor (N1) is denoted L(N1). In such an embodiment, L(N1) is the quality of the single point-to-point link between S and N1. In the case of the 2-hop neighbor table, the stored LSI from S to a given 2-hop neighbor (N2) is denoted L(N2). This LSI could be the quality of the best 2-hop path from S to N2 or it could represent the quality of transmission from S to N2 that results when some intermediate subset of nodes relay cooperatively (as would be the case in a barrage relay network).

In one embodiment of the present invention, the TTL field of a subsequent multicast transmission from S to $D_1, \ldots, D_T$ is set to:
  (a) one if all of $D_1, \ldots, D_T$ are a distance 1 from S and if $L(D_t) > L_1$ for all $t=1, \ldots, T$ (where $L_1$ is some threshold on one-hop quality).
  (b) two if all of $D_1, \ldots, D_T$ are a distance 1 from S and if $L(D_t) < L_1$ for at least one $t=1, \ldots, T$.
  (c) two if all of $D_1, \ldots, D_T$ are a distance 1 or 2 from S, at least one of $D_1, \ldots, D_T$ is at a distance of 2 from S, and if $L(D_t) > L_2$ for all $t=1, T$ (where $L_2$ is some threshold on 2-hop quality).
  (d) three if all of $D_1, \ldots, D_T$ are a distance 1 or 2 from S, at least one of $D_1, \ldots, D_T$ is at a distance of 2 from S, and if $L(D_t) < L_2$ for at least one $t=1, \ldots, T$.
  (e) $TTL_D$ otherwise.

Figure 2:
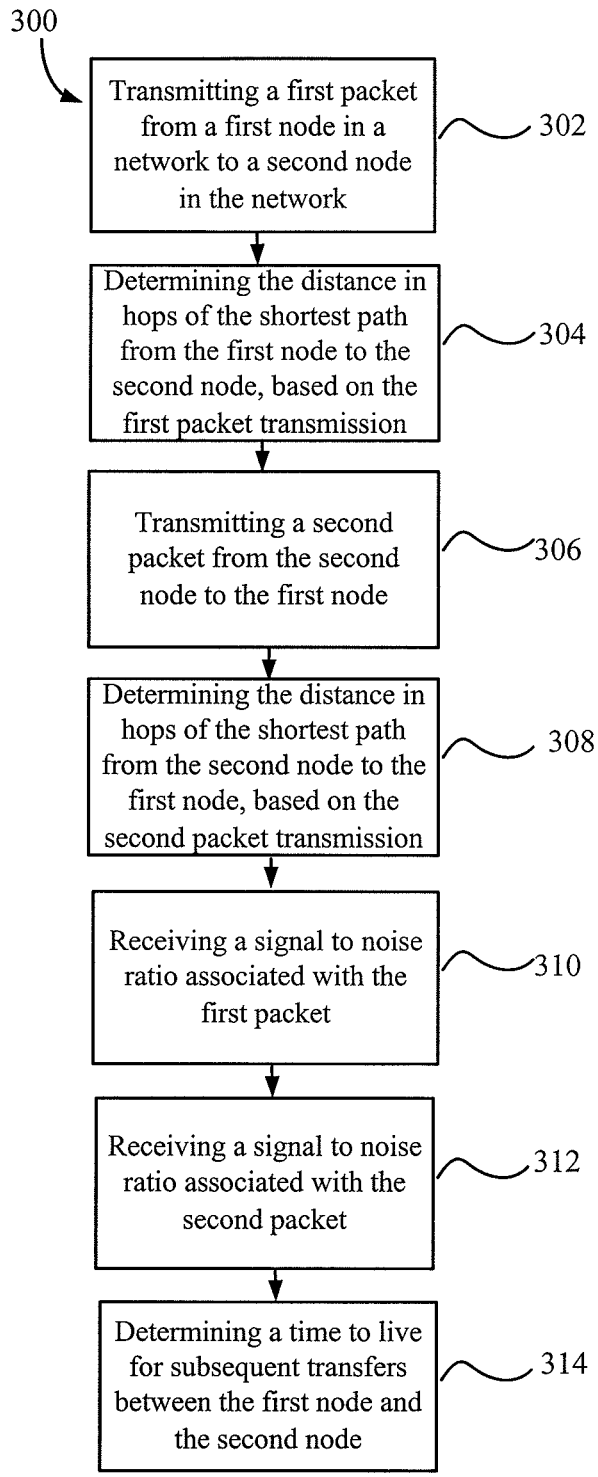
FIG. 2 is a flow chart for a method for on-demand adaptation of packet time-to-live in time-slotted barrage relay networks, according to one embodiment of the present invention.

FIG. 2 is flow chart for a method for on-demand adaptation of packet TTL in time-slotted barrage relay networks, according to one embodiment of the present invention. In some embodiments, the order of steps in flow chart 300 may be changed. Further, some of the steps shown in flow chart 300 may be skipped or additional steps added.

As shown in FIG. 2, the method 300 begins at 302 when a first packet is transmitted from a first node in a network to a second node in a network. In one embodiment, the first node and the second node are both nodes in a barrage relay network. In some embodiments, each node in the network comprises an actively maintained neighbor table. In such an embodiment, the neighbor table may comprise data such as a list of nodes that are a distance of 1- or 2-hops from the given node and LSI for the link between the given node and the nodes that are a distance of 1- or 2-hops from the given node.

The method 300 continues at step 304, when a shortest path from a first node to the second node is determined based on the packet transmission. In some embodiments, the TTL field of this packet is set to the system default (i.e., the value that ensures all network nodes receive the packet). The data field Packet S→D lists unique identifiers (UIDs) of S and D so that D can ascertain that it is indeed the intended destination for this packet (and that S was indeed the source).

At step 306, a second packet is transmitted from the second node to the first node. At step 308, a shortest path from the second node to the first node is determined based on the second packet transmission.

At step 310, LSI, such as a SNR associated with the first packet, is received. In some embodiments of the present invention, the LSI associated with the reception of the protocols employed by the discovery protocol is known. For example, in one embodiment, let L(D) denote the received LSI of Packet S→D at node D. Further, in such an embodiment, let L(S) denote the received LSI of Packet D→S at node S. In addition to the hop distance d(S→D), in some embodiments, L(D) can also be included in Packet D→S so that following the two-phase discovery protocol, the source node S knows both L(S) and L(D), as well as both d(S→D) and d(D→S). At step 312, a SNR associated with the second packet is received.

At step 314, a TTL for subsequent transfers between the first node and the second node is determined. In some embodiments, this time-to-live TTL may be determined based on the shortest path between the two nodes. For example, in one embodiment of the present invention, the source node may set the TTL for subsequent data transfers between S and D (denoted $TTL_{S \to D}$) based only on the $d(S \to D)$ value obtained via the discovery protocol described above. Specifically, the source node may set the value of $TTL_{S \to D}$ according to Equation (2) described previously.

Following Equation (2), the spatial pipelining factor used for subsequent data transfers between S and D (denoted $M_{S \to D}$) can then be set as discussed above at Equations (3) and (4). In other embodiments of the present invention, the source node sets $TTL_{S \to D}$ based on $d(S \to D)$ and L(D). For example, in one embodiment of the present invention, the source node sets $TTL_{S \to D}$ based only on $d(S \to D)$ and L(D), as discussed above with regard to Equation (5). In another embodiment of the invention, the source node sets the TTL of subsequent data packets from S to D based on $d(S \to D)$ and both L(D) and L(S), as discussed with regard to Equation (6).

Figure 3:
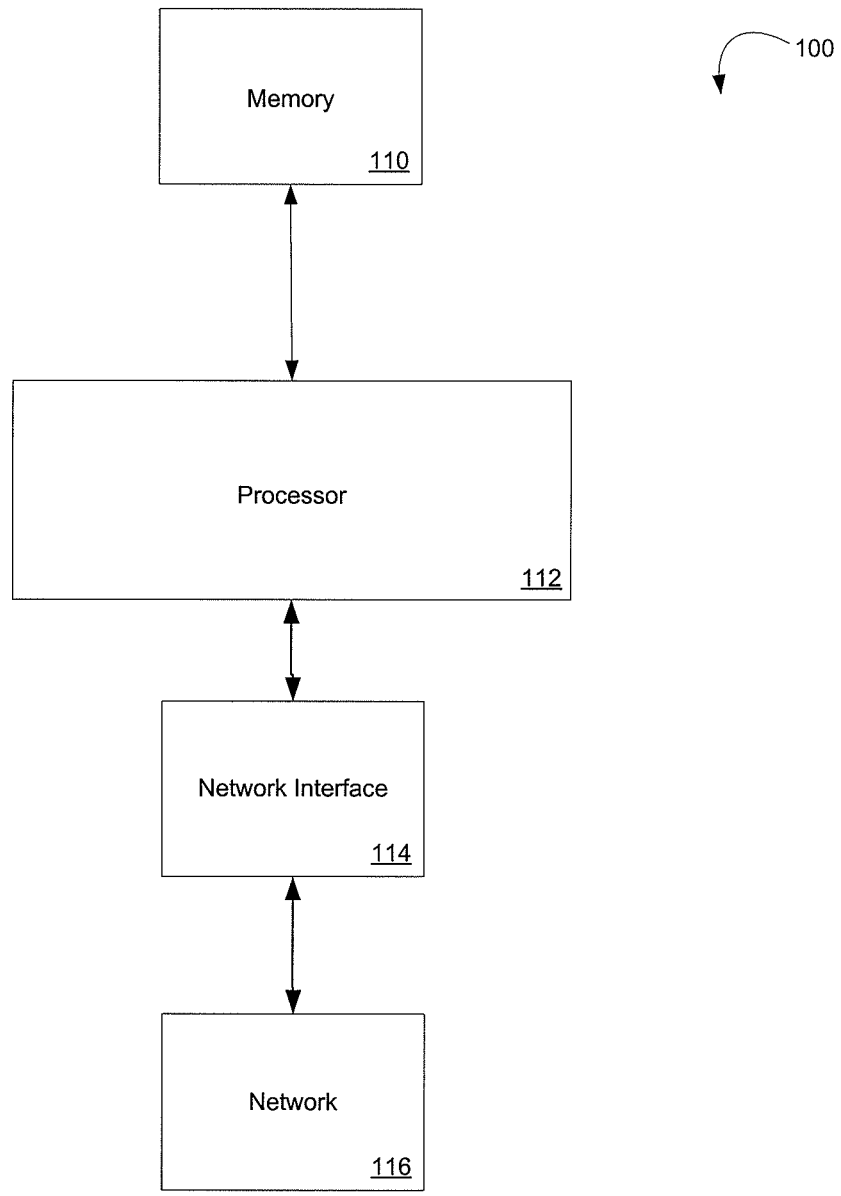
FIG. 3 is a block diagram of a system for on-demand adaptation of packet time-to-live in time-slotted barrage relay networks, according to one embodiment of the present invention.

FIG. 3 is a block diagram of a device implemented as a node for on-demand adaptation of packet TTL in time-slotted barrage relay networks according to one embodiment of the present invention. As shown in FIG. 3, the system 100 comprises a memory 110, a processor 112, a network interface 114, and a network 116.

The processor 112 is configured to execute computer-executable program instructions stored in memory 110. For example, processor 112 may execute one or more computer programs for adaptation of packet time-to-live in time-slotted barrage relay networks in accordance with embodiments of the present invention. Processor 112 may comprise a microprocessor, a digital signal processor (DSP), an application-specific integrated circuit (ASIC), one or more field programmable gate arrays (FPGAs), state machines, or the like. Processor 112 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 110 comprises a computer-readable medium that stores instructions that when executed by processor 112, cause processor 112 to perform various steps, such as those described herein. Examples of computer-readable media include, but are not limited to, an electronic, optical, magnetic, or other storage or transmission devices capable of providing processor 112 with computer-readable instructions. Other examples of computer-readable media comprise, but are not limited to, a floppy disk, CD-ROM, magnetic disk, memory chip, ROM, RAM, ASIC, configured processor, all optical media, all magnetic tape or other magnetic media, or any other medium from which a computer processor can access data. In addition, various other devices may include computer-readable media such as a router, private or public network, or other transmission devices. The processor 112 and the processing described may be in one or more structures, and may be dispersed throughout one or more structures.

Processor 112 is in communication with the network interface 114. The network interface 114 may comprise one or more network connections. Network interface 114 connects processor 110 to network 116. Network 116 may be one of many types of networks known in the art. For example, network 116 may comprise a wired or wireless network, such as a BRN.

GENERAL CONSIDERATIONS

For the purposes of this specification, unless otherwise indicated, all numbers used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

While the present subject matter will be described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A method for transmitting packets in a wireless ad hoc network employing time-slotted barrage relay comprising:
    transmitting a first packet from a first node in the wireless ad hoc network to a second node in the wireless ad hoc network;
    determining a first path distance, in terms of number of hops, from the first node to the second node, based on the first packet transmission;
    transmitting a second packet from the second node to the first node, wherein the second packet includes content representing the first path distance;
    determining a time-to-live value for subsequent transfers from the first node to the second node, by taking into account the first path distance, wherein the time-to-live value limits the number of hops each packet is allowed to take in subsequent transfers from the first node to the second node; and
    determining a spatial pipelining factor for the subsequent transfers from the first node to the second node based on the time-to-live value, wherein the spatial pipelining factor determines a throughput of the subsequent transfers from the first node to the second node.

2. The method of claim 1, further comprising:
    determining a second path distance, in terms of number of hops, from the second node to the first node, based on the second packet transmission;
    wherein determination of the time-to-live value for the subsequent transfers from the first node to the second node further takes into account the second path distance.

3. The method of claim 1, further comprising:
    determining a first link quality measure associated with reception of the first packet by the second node;
    wherein determination of the time-to-live value for the subsequent transfers from the first node to the second node further takes into account the first link quality measure.

4. The method of claim 3, further comprising:
    determining a second link quality measure associated with reception of the second packet by the first node;
    wherein determination of the time-to-live value for the subsequent transfers from the first node to the second node further takes into account the second link quality measure.

5. The method of claim 3, wherein the first link quality measure comprises a received signal-to-noise ratio.

6. The method of claim 1, wherein determination of the time-to-live value comprises:
    setting the time-to-live value to 1 hop, if a first condition is met;
    setting the time-to-live value to 2 hops, if a second condition is met; and
    setting the time-to-live value to a default maximum number of hops, if a third condition is met.

7. The method of claim 1, wherein the first packet comprises a unique identifier for the first node, and the second packet comprises a unique identifier for the second node.

8. A method for multicasting packets in a wireless ad hoc network employing time-slotted barrage relay comprising:
    at a first node in the ad hoc network, maintaining (1) a one-hop table identifying nodes having a one-hop path distance from the first node, and (2) a two-hop table identifying nodes having a two-hop distance from the first node;
    determining a time-to-live value for a multicast transmission from the first node to a plurality of destination nodes, by taking into account the extent to which the plurality of destination nodes are identified in the one-hop table and the extent to which the plurality of destination nodes are identified in the two-hop table; and
    determining a spatial pipelining factor for the multicast transmission from the first node to the plurality of destination nodes based on the time-to-live value, wherein the spatial pipelining factor determines a throughput of the multicast transmission.

9. The method of claim 8, further comprising:
    at the first node, maintaining link quality measures corresponding to nodes identified in the one-hop table and the two-hop table;
    wherein determination of the time-to-live value for the multicast transmission further takes into account the link quality measures corresponding to the plurality of destination nodes.

10. A non-transitory tangible computer-readable medium embodying program code executable by a computing system, the program code comprising:
    program code for maintaining, at a first node in a wireless ad hoc network employing time-slotted barrage relay, (1) a one-hop table identifying nodes having a one-hop path distance from the first node, and (2) a two-hop table identifying nodes having a two-hop distance from the first node;

program code for determining a time-to-live value for a multicast transmission from the first node to a plurality of destination nodes, by taking into account extent to which the plurality of destination nodes are identified in the one-hop table and extent to which the plurality of destination nodes are identified in the two-hop table; and program code for determining a spatial pipelining factor for the multicast transmission from the first node to the plurality of destination nodes based on the time-to-live value, wherein the spatial pipelining factor determines a throughput of the multicast transmission.

11. The non-transitory tangible computer readable medium of claim 10, further comprising:

program code for, at the first node, maintaining link quality measures corresponding to nodes identified in the one-hop table and two-hop table;

wherein determination of the time-to-live value for the multicast transmission further takes into account the link quality measures corresponding to the plurality of destination nodes.

\* \* \* \* \*